United States Patent [19]

Steelman

[11] Patent Number: 4,820,559

[45] Date of Patent: Apr. 11, 1989

[54] GRAPHICS TRANSFER MEDIUM

[75] Inventor: Ronald S. Steelman, Oakdale, Minn.

[73] Assignee: Minnesota Mining and Manufacturing Company, St. Paul, Minn.

[21] Appl. No.: 202,881

[22] Filed: Jun. 6, 1988

Related U.S. Application Data

[60] Division of Ser. No. 110,550, Oct. 19, 1987, Pat. No. 4,770,732, which is a continuation of Ser. No. 519,528, Aug. 1, 1983, abandoned.

[51] Int. Cl.[4] .................. B32B 3/00

[52] U.S. Cl. .................. 428/36.1; 428/195; 428/343; 428/355; 428/914; 428/143

[58] Field of Search .................. 428/36, 195, 343, 355, 428/914, 143

[56] References Cited

U.S. PATENT DOCUMENTS

| | | | |
|---|---|---|---|
| 1,968,095 | 7/1934 | Poschel . | |
| 3,446,682 | 5/1969 | Dean | 156/236 |
| 3,446,683 | 5/1969 | Dean . | |
| 3,567,222 | 2/1971 | Drake . | |
| 3,860,471 | 1/1975 | Blanco et al. . | |
| 3,997,384 | 12/1976 | Kuring et al. . | |
| 4,062,644 | 12/1977 | Sponaes et al. . | |
| 4,169,169 | 9/1979 | Hitabatake . | |
| 4,264,643 | 4/1981 | Granata et al. | 156/308.6 |
| 4,374,691 | 2/1983 | Bergh | 428/143 |

FOREIGN PATENT DOCUMENTS

| | | |
|---|---|---|
| 2931932 | 2/1981 | France . |

*Primary Examiner*—James J. Bell

*Attorney, Agent, or Firm*—Donald M. Sell; Walter N. Kirn; Robert H. Jordan

[57] ABSTRACT

A flexible low-adhesion carrier web has a coating in the form of graphics including a matrix resin, a binder resin, and a light-altering agent such as a pigment. When the coating in wet with a transfer fluid such as mineral spirits, this activates the binder resin to permit the graphics to be transferred to a display surface such as a glass window.

7 Claims, 1 Drawing Sheet

GRAPHICS TRANSFER MEDIUM

CROSS-REFERENCE TO RELATED APPLICATIONS

This is a divisional application of U.S. application Ser. No. 110,550, filed Oct. 19, 1987, U.S. Pat. No. 4,770,732, which is a continuation of U.S. application Ser. No. 519,528, filed Aug. 1, 1983, now abandoned.

FIELD OF INVENTION

The present invention relates to a transfer medium for applying graphics to a display surface.

BACKGROUND ART

Retail businesses often make visual announcements by hand lettering or stenciling display surfaces such as windows or by hanging posters or newspaper advertisements. Such announcements may be unsightly unless an inordinate amount of time is devoted to their creation and application.

Visual announcements may also take the form of decals which may incorporate ornamentation and can be highly attractive. However, decals are expensive to create and difficult to remove. Because water-soak decals tend to be cumbersome, slow to apply, and difficult to position, pressure-sensitive adhesive decals have come into widespread use. However, either the adhesive must be applied in register with the graphics or some mechanism must be provided to separate the adhesive at the precise outline of the graphics. These requirements are particularly difficult to achieve if the graphics have fine detail.

DISCLOSURE OF THE INVENTION

By the method of the invention, graphics having fine detail and quality appearance can be applied with precision to a display surface easily and at remarkably low cost. Simple adjustments in the method permit the transferred graphics to be either difficult or easy to remove from the display surface.

In short, the novel method comprises the sequential steps of (1) applying to a flexible low-adhesion carrier web a coating in the form of graphics, which coating comprises a liquid mixture of (a) matrix resin, (b) binder resin, and (c) light-altering agent, (2) solidifying the coating of graphics, (3) wetting the solidified coating of graphics with a fluid which at least partially dissolves the binder resin and substantially does not attack either the matrix resin or the carrier web, (4) pressing the wet coating of graphics against a display surface, (5) allowing to develop between the coating of graphics and the display surface a bond which is stronger than the bond between the coating and the carrier web, and (6) peeling away the carrier web to leave the coating of graphics on the display surface.

In step (1) the liquid mixture can be applied by any conventional coating technique, e.g., screen printing, spray painting, or knife coating. By printing the liquid mixture onto the carrier web, the graphics can have exceedingly fine detail and may be applied in half tones and multiple colors. As do conventional printable inks of the prior art, the liquid mixture may include pigments, dyes, fillers, and/or other light-altering agents and may also contain ultraviolet light absorbers, antioxidants, flow-control agents and surfactants, some of which may also be light-altering agents. Particulate light-altering agents are preferred, being more resistant than are dyes to the transfer fluids used in step (3). Also, the light-altering characteristics of particulates are less likely to change over periods of time than are dyes. Light-altering particulates may be used in proportions up to the critical pigment volume concentration, but any lesser proportion is viable unless opacity is required.

The liquid mixture may comprise solids dissolved or dispersed in a volatile vehicle, whereupon step (2) involves evaporating the vehicle. Instead, the liquid mixture may comprise polymerizable liquid monomers which in step (2) are polymerized in situ to a solid state. Such polymerization can be effected by heating or by exposure to actinic radiation and normally requires a suitable catalyst to be included in the liquid mixture.

Preferred as the flexible, low-adhesion carrier web are polyethylene, polypropylene, polyallomer, and polytetrafluoroethylene films which are known to have low affinity for resin coatings while being highly resistant to fluids which attack the binder resin. Each of these films is transparent, which makes it easier to position the graphics on a display surface. Polyethylene is preferred because of its low cost. Other useful plastic films tend to be more expensive than polyethylene and may have low-adhesion coatings which add to their expense. The plastic films may incorporate reinforcing fibers or fabrics. Plastic-coated paper is also useful.

The binder resin is a film-forming resin which preferably adheres well to most surfaces but is at least partially dissolved by an economical, readily available transfer fluid such as turpentine or mineral spirits. Useful binder resins include acrylics such as butyl methacrylate, vinyl acetate copolymers, polyamides, polyurethanes, and other resins typically used in paints and coatings to promote adhesion. Preferably the binder resin has a Tukon hardness of less than 10.

The matrix resin is a film-forming resin which provides a polymeric network that is resistant to transfer fluids which at least partially dissolve the binder resin. The matrix and binder resins should be thoroughly mixed so that the matrix resin will prevent any smearing of the coating of graphics even if the transfer fluid should completely dissolve the binder resin. Preferred matrix resins are polyurethanes, cellulose containing polymers, and vinyl chloride copolymers. Both the matrix resin and the binder resin can be polyurethanes due to their wide range of solubilities. Polyurethanes made from mono-functional or low-molecular-weight reactants tend to have better solubility and hence to be useful as binder resins.

The transfer fluid applied in step (3) may completely dissolve the binder resin or it may merely soften and tackify the binder resin sufficiently to allow a bond to develop when in step (4) the wet graphics are pressed against a display surface. Preferred transfer fluids are characterized by high (above 8.5) or low (below 4.0) hydrogen bonding indices, because they tend not to attack preferred matrix resins. If a transfer fluid does attack a certain matrix resin, that problem can usually be averted by substituting a transfer fluid which may have the same hydrogen bonding index but a different solubility parameter. For example, toluene and turpentine have the same hydrogen bonding index (3.8), but toluene (solubility parameter of 8.9) attacks more resins than does turpentine (solubility parameter of 8.1). The hydrogen bonding index of mineral spirits is 2.2. Other useful transfer fluids include isopropyl alcohol and ethyl alcohol, each of which has a hydrogen bonding index of 8.9. Their solubility parameters are 11.5 and 13.6, respectively. Also shown to be useful is "Penola" 150 which is a mixture of aromatic hydrocarbons having a 65° C. flashpoint, a hydrogen bonding index of about 3.8, and a solubility parameter of about 8.5.

The matrix resin may comprise as little as 2% and as much as 50% by weight of total matrix and binder resins, preferably at least 5% when using a transfer fluid that dissolves the binder resin. When the proportion of matrix resin is small, the amount of transfer fluid preferably is limited to an amount barely sufficient to wet the entire coating of graphics. Usually the proportion of matrix resin is kept to the minimum that will assure no smearing of the coating of graphics, because high proportions of binder resin ensure good adhesion to display surfaces. For this reason, the proportion of matrix resin preferably does not exceed 30% by weight of total matrix and binder resins.

The solidified coating of graphics preferably has a thickness within the range of 0.0025 to 0.025 mm. Within that range, the graphics after being transferred to a display surface can have the appearance of exactingly-applied paint, giving an aura of high quality. Below 0.0025 mm the graphics may involve transfer problems. Above 0.05 mm would usually be wasteful of raw materials.

Upon solidifying the coating in step (2), the carrier web and its coating of graphics provide a graphic transfer medium which can be wound upon itself for storage and shipment and can be used by retail merchants for applying the graphics to display surfaces such as windows. High quality graphics are obtainable, because they can be created at a central location for large numbers of merchants who need only to activate the binder resin with a transfer fluid in order to transfer the graphics to a display surface.

As indicated above, the graphics transfer medium of the invention may be most useful in enabling retail merchants to post visual announcements of high quality at low expense. However, the novel medium should have a number of other important uses. For example, it can be used to apply decorative and functional graphics to vehicular surfaces, and for such use the light-altering agent may comprise retroreflective beads. The novel medium also can be used wherever there is a need for graphics that are not noticably raised above a display surface.

BRIEF DESCRIPTION OF THE DRAWINGS

The invention is further explained with reference to the drawings wherein.

DETAILED DESCRIPTION

Figure 1:
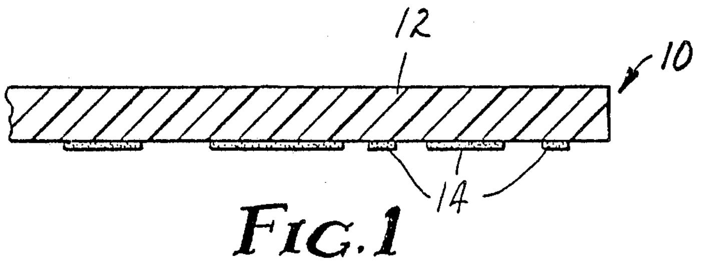
FIG. 1 is a schematic cross section of a graphics transfer medium of the invention.
Figure 2:
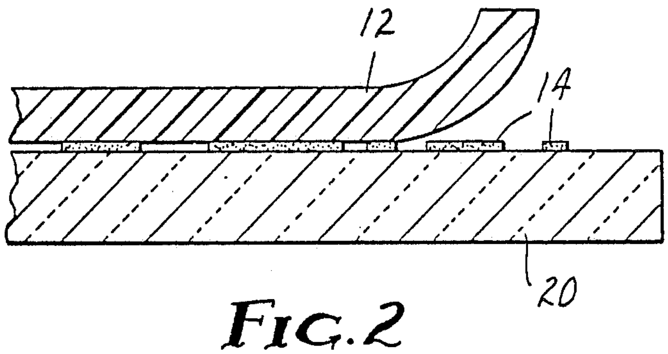
FIG. 2 schematically shows the use of the medium of FIG. 1 to transfer a coating of graphics to a display surface.

A graphics transfer medium 10 shown in FIG. 1 includes a flexible low-adhesion carrier web 12 and a coating 14 of graphics. After wetting the coating 14 with a transfer fluid, the medium 10 has been applied to a display surface 20, as shown in FIG. 2, and the carrier 12 is being peeled away to transfer the coating 14 of graphics to the display surface.

In the following examples, all parts and percentages are by weight unless otherwise stated.

EXAMPLE 1

| | grams |
|---|---|
| Polybutylmethacrylate binder resin (2044 from DuPont) | 21.56 |
| Nitrocellulose matrix resin (SS ½ from Hercules) | 2.16 |
| Light yellow pigment (DuPont "Krolor") | 15.21 |
| Dimethyl siloxane flow-control agent (G.E. SF-96) | 0.019 |
| Fluorochemical surfactant (3M FC-430) | 0.46 |
| Dipropylene glycol monomethyl ether solvent | 58.76 |
| Xylene | 1.83 |

The solids were added to the solvent according to recommendations of the raw material suppliers to yield a screen-printable ink having a viscosity of approximately 2500 cps. This was screen-printed onto a transparent medium-density polyethylene carrier web approximately 0.125 mm thick. The screen printing was a test pattern including the alphabet, various geometric patterns, fine lines, and half tones. The coating was solidified by drying overnight in air to yield a dried thickness of approximately 0.01 mm. The resulting graphic transfer medium could be wound upon itself into roll form for storage and shipment.

Turpentine transfer fluid was sprayed onto an aluminum panel in an amount barely sufficient to wet its surface. The coating of the medium was placed in contact with the wet surface and firmly rubbed down. After approximately 30 seconds, the polyethylene carrier web was stripped off leaving graphics which appeared to have the same quality as the original test pattern. After drying overnight, the graphics were resistant to scratching, moisture, and sunlight.

Other specimens of Example 1 were successfully transferred to polyester film, glass plate, polycarbonate sheeting, polymethylmethacrylate sheet, and baked enamel metal panel.

EXAMPLES 2-8

Graphics transfer media similar to that of Example 1 were prepared using transparent low-density polyethylene film as the flexible, low-adhesion carrier web. The ingredients of the coatings of graphics are indicated in parts by weight in Tables A and B except that Examples 5-8 included 0.015 part of the siloxane, 0.37 part of the fluorochemical, and 1.485 part of the xylene used in Example 1.

TABLE A

| | Example 2 | Example 3 | Example 4 |
|---|---|---|---|
| Binder resins: | | | |
| Copolymer of methylmethacrylate and ethyl acrylate ("Acryloid" B-82 of Rohm & Haas). | 26.48 | — | — |

TABLE A-continued

| | Example 2 | Example 3 | Example 4 |
|---|---|---|---|
| Polyamide ("Emerez" 1533 of Emery) | — | 20.01 | — |
| Aliphatic Polyurethane (LO6-305 of Spencer Kellogg) | — | — | 16.78 |
| Matrix resins: | | | |
| Copolymer of vinyl acetate and vinyl chloride ("VYHH" of Union Carbide) | — | — | 2.51 |
| Nitrocellulose (SS ¼ of Hercules) (70% solids) | — | 2.60 | — |
| Polymethylmethacrylate ("Acryloid" A-10 of Rohm & Haas) | 13.24 | — | — |
| Light-altering agents: | | | |
| "Krolor" light yellow pigment (E.I. duPont) | — | 20.00 | — |
| Monastral green pigment (E.I. duPont) | — | — | 0.80 |
| Phthalo blue pigment (E.I. duPont) | 4.08 | — | — |
| Calcium Carbonate "Atomite" (Thompson Weinman Co.) | 2.01 | — | — |
| Volatile components: | | | |
| Carbitol acetate | 28.68 | — | — |
| Cyclohexanone | — | — | 40.77 |
| Dipropylene glycol mono-methyl ether | — | 10.40 | — |
| 2-Ethoxyethyl acetate | 25.51 | | |
| Isopropanol | — | 46.99 | 19.57 |
| Toluene | — | — | 19.57 |

TABLE B

| | Example 5 | Example 6 | Example 7 | Example 8 |
|---|---|---|---|---|
| Binder resins: | | | | |
| Poly n-butyl methacrylate ("Elvacite" 2044 of E. I. duPont) | 25.40 | 26.03 | 17.85 | 20.16 |
| Matrix resins: | | | | |
| Copolymer of vinyl acetate and vinyl chloride ("VYHH" of Union Carbide) | 5.10 | — | — | — |
| Nitrocellulose (RS ½ of Hercules) (70% solids) | — | 2.75 | — | 1.73 |
| Cellulose acetate butyrate (CAB-500-1 of Eastman Chem.) | — | — | 5.29 | — |
| Light-altering agents: | | | | |
| Monastral blue pigment (E. I. duPont) | 3.40 | — | — | — |
| "Krolor" light yellow pigment (E. I. duPont) | — | — | 12.60 | — |
| "Silicron G-600 silica (Glidden) | — | — | — | 5.04 |
| "Titanox" pigment (N. L. Industries) | — | 4.82 | — | — |
| Volatile components: | | | | |
| Cyclohexane | 64.23 | 33.94 | 12.35 | — |
| Dipropylene glycol mono-methyl ether | — | 30.59 | 50.04 | 71.20 |

Used to transfer the graphics of Examples 2–8 to various substrates were

| for Example | transfer fluid |
|---|---|
| 2 | Isopropyl alcohol or "Penola" 150 |
| 3 | Turpentine |
| 4 | Turpentine |
| 5 | Mineral spirits |
| 6 | Turpentine |
| 7 | Turpentine |
| 8 | Turpentinc |

Additional graphics transfer media have been prepared which were identical to those of Examples 1–8 except by changing the percent of the matrix resin to total matrix and binder resins. Good results were demonstrated within the following ranges:

| resins of Example | percent |
|---|---|
| 1 | 4–20 |
| 2 | 20–45 |
| 3 | 4–20 |
| 4 | 9–20 |
| 5 | 15–30 |
| 6 | 4–20 |
| 7 | 15–35 |
| 8 | 4–20 |

The graphics transferred from the medium of Example 4 could be peeled off various display surfaces such as glass plate, polyester film, and lacquered metal. The graphics transferred to such surfaces from the media of Examples 1–3 and 5–8 could not be removed intact.

When the light-altering agent was nearly colorless silica as in Example 8 and the graphics were transferred to a glass plate, the image looked very much like glass which had been etched.

I claim:

1. A graphics transfer medium comprising a flexible low-adhesion carrier web carrying a coating in the form of graphics thereon, which when contacted with a transfer fluid is capable of being transferred to a display surface, said coating comprising a mixture of:

(a) sufficient matrix resin to prevent smearing of said coating during transfer, said matrix resin being resistant to said transfer fluid, (b) sufficient binder resin to provide adhesion of said coating to said display surface, said binder resin being at least partially soluble in said transfer fluid, said matrix resin and said binder resin being thoroughly mixed, and said matrix resin comprising at least 2 percent by weight of total matrix and binder resins, and (c) light-altering agent, wherein said coating, when wet with said transfer fluid in an amount at least sufficient to wet the entirety of said coating, is capable of forming a bond to said display surface sufficient to enable said coating to be transferred from said carrier web to said display surface.

2. A medium as defined in claim 1 wound upon itself in roll form for storage or shipment.

3. A medium as defined in claim 1 wherein the matrix resin comprises from 2 to 50 percent by weight of total matrix and binder resins.

4. A medium as defined in claim 3 wherein the matrix resin comprises from 5 to 30 percent by weight of total matrix and binder resins.

5. A medium as defined in claim 4 wherein the binder resin has a Tukon hardness of less than 10.

6. A medium as defined in claim 5 wherein the carrier web is transparent.

7. A medium as defined in claim 1 wherein the light-altering agent comprises pigment.

* * * * *

UNITED STATES PATENT AND TRADEMARK OFFICE
CERTIFICATE OF CORRECTION

PATENT NO. : 4,820,559

DATED : APRIL 11, 1989

INVENTOR(S) : RONALD S. STEELMAN

It is certified that error appears in the above-identified patent and that said Letters Patent is hereby corrected as shown below:

Col. 5, line 41, --2160-- should be inserted immediately before the word "pigment".

Col. 5, line 43, "Cyclohexane" should be --Cyclohexanone--.

Column 5, lines 17 and 18, the last two lines in Table A should be

| | | | |
|---|---|---|---|
| --Isopropanol | - | 46.99 | 19.57 |
| Toluene | - | - | 19.57--. |

Column 6, the heading " -continued / resins of Example percent " should appear after the last two lines in Table A.

Signed and Sealed this

Fifth Day of June, 1990

*Attest:*

HARRY F. MANBECK, JR.

*Attesting Officer*

*Commissioner of Patents and Trademarks*